UNITED STATES PATENT OFFICE.

GUSTAV JEBSEN, OF CHRISTIANIA, NORWAY, ASSIGNOR, BY MESNE ASSIGNMENTS, TO TITAN CO. A/S., OF CHRISTIANIA, NORWAY.

REMOVAL OF UNDESIRED ACID SUBSTANCE FROM TITANIUM HYDRATES AND THE PRODUCT OBTAINED THEREBY.

1,361,867. Specification of Letters Patent. Patented Dec. 14, 1920.

No Drawing. Application filed October 12, 1917. Serial No. 196,979.

*To all whom it may concern:*

Be it known that I, GUSTAV JEBSEN, a subject of Norway, and a resident of Christiania, Kingdom of Norway, have invented certain new and useful Improvements in the Removal of Undesired Acid Substance from Titanium Hydrates and the Product Obtained Thereby, of which the following is a specification, this application being a continuation in part of my application Sr. No. 156,988, filed March 23, 1917.

This invention relates to titanium compounds which are to be employed in the manufacture of pigments and the object of the invention is a novel treatment of the compounds whereby they may be rendered suitable for this purpose.

When solutions of titanium compounds are subjected to precipitation and the precipitate washed and dried, it has been found to contain certain substances of an acid character.

As an example, when titanium hydrate compounds are precipitated according to known methods from a solution of titanium sulfates, the precipitate thus obtained will in spite of energetic washing contain considerable sulfuric acid either in the form of a basic salt or adsorbed acid. In some cases more than 7 per cent. of the $SO_4$ radical is present in the resutant precipitate.

I have found that this acid substance renders the precipitate unsatisfactory for pigment use and have discovered certain methods whereby it may be eliminated.

One method of bringing this about is by treating the precipitate with a solution of a compound, the metal of which will form an insoluble compound with the undesired acid present, and subsequently freeing the product from the second compound formed or liberated by the double decomposition. When the precipitate contains the $SO_4$ radical, I prefer to use the salts or hydroxids of barium or calcium for the purpose above outlined. This method and the product obtained thereby, however, form the subject-matter of another application Sr. No. 196,978 filed contemporaneously herewith and consequently no claims thereto are herein made.

Another method of accomplishing this result consists in treating the precipitate of titanium compounds with a basic substance such as the alkaline compounds of sodium, potassium or ammonium. To assure the complete removal of the undesired acid substances present in the precipitate, I prefer to use a slight excess of the basic substance selected for this purpose. After the reaction has taken place the soluble salts formed together with the excess of basic substance employed, are removed by washing. If the basic substance employed is of such a nature that it cannot be readily removed in this manner, I add to the mass a dilute solution of an acid such as sulfuric or hydrochloric, in quantity just sufficient to neutralize the said excess, the acid employed being of such low concentration as not to act to any appreciable extent upon the titanium hydrates present; and then remove the dissolved materials by washing.

It is the last-named method together with the product obtained thereby which comprises the invention herein claimed. By way of illustration of this method I will make use of a titanium precipitate thrown down from a solution of titanium sulfate to be treated by a solution of ammonium hydroxid, it being understood that these substances are chosen for illustrative purposes only and that my invention is by no means limited thereto. I will more specifically make use of titanium compounds precipitated from a solution of the sulfates prepared in accordance with United States Letters Patent 1,333,819, granted March 16, 1920, which corresponds with Norwegian Patent No. 27,292 of November 1, 1915, which solution I have found very well adapted for treatment in accordance with this invention. No claim is here made to the said solution as such, nor to the process of preparing it, as the same forms the subject matter of the said Letters Patent.

The precipitate chosen for illustration is placed in any suitable container and thoroughly washed with water. A solution of ammonium hydroxid is then added to the washed precipitate and the mixture stirred until reaction is completed. I prefer to employ the ammonium hydroxid in the form of a dilute solution and to use a slight excess over that required to combine with all of the $SO_4$ radical present in the washed precipitate.

If the undesired acid substance is in the form of a basic titanium salt, this reaction results in the formation of a precipitate of titanium hydroxid, and ammonium sulfate. The ammonium sulfate, being soluble, is removed by subsequent washing. If the undesired acid substance is in the form of adsorbed sulfuric acid only ammonium sulfate and water are formed and these are removed as above stated. The slime resulting in either case is now ready for subsequent treatment, for example, drying or calcining, preparatory to the forming of a pigment.

The above process results in the formation of the final product here sought which comprises hydrated oxids of titanium and which is particularly suitable for use in the manufacture of a pigment.

The word "hydrates" as used herein is applied as a general term and includes hydrated oxids with or without more or less basic salts or absorbing acids.

The foregoing detailed description has been given for clearness of understanding, and no undue limitation should be deduced therefrom, but the appended claims should be construed as broadly as permissible in view of the prior art.

What I claim as new and desire to secure by Letters Patent of the United States is:

1. The process of treating precipitated titanium hydrates containing an undesired acid substance whereby the said undesired acid substance is removed, which comprises treating the precipitate with an alkaline material which reacts with the undesired acid substance to form a neutral soluble salt, and removing the said salt.

2. The process of treating precipitated titanium hydrates containing an undesired acid substance embracing the $SO_4$ radical whereby the said undesired acid substance is removed, which comprises washing the precipitate, treating the washed precipitate with a soluble alkaline material the sulfate of which is soluble and thereby forming a neutral soluble salt, and removing the said salt, the quantity of the alkaline material employed being sufficient to combine with all of the $SO_4$ radical present in the precipitate.

3. The process of treating precipitated titanium hydrates containing an undesired acid substance embracing the $SO_4$ radical whereby the said undesired acid substance is removed, which comprises washing the precipitate, treating the washed precipitate with a soluble alkaline material the sulfate of which is soluble and thereby forming a neutral soluble salt, the quantity of the alkaline material employed being in excess of that required to combine with all of the $SO_4$ radical present in the precipitate, neutralizing the excess of alkaline material with a dilute acid, and removing the soluble material formed by washing.

4. The process of treating precipitated hydrates containing an undesired acid substance embracing the $SO_4$ radical whereby the said undesired acid substance is removed, which comprises washing the precipitate, treating the washed precipitate with an ammonium compound and thereby forming ammonium sulfate, and removing the said ammonium sulfate, the quantity of ammonium compound employed being sufficient to combine with all of the $SO_4$ radical present in the precipitate.

5. The process of treating precipitated hydrates containing an undesired acid substance embracing the $SO_4$ radical whereby the said undesired acid substance is removed, which comprises washing the precipitate, treating the washed precipitate with a solution of ammonium hydroxid and thereby forming ammonium sulfate and removing the said ammonium sulfate, the quantity of ammonium hydroxid employed being sufficient to combine with all of the $SO_4$ radical present in the precipitate.

6. As a new and useful article, a material suitable for use in the manufacture of a pigment, comprising principally a hydrated oxid of titanium, said material being formed by treating precipitated titanium hydrates containing an undesired acid substance with a basic compound which reacts with the said acid substance to form a soluble compound and removing the said soluble compound.

Signed at Christiania, Norway, on this 14th day of September, 1917.

G. JEBSEN.